(12) United States Patent
Liao

(10) Patent No.: US 12,474,748 B2
(45) Date of Patent: Nov. 18, 2025

(54) FIXING FRAME FOR COMPUTER APPARATUS

(71) Applicant: MITAC COMPUTING TECHNOLOGY CORPORATION, Taoyuan (TW)

(72) Inventor: Chih-Hsing Liao, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 201 days.

(21) Appl. No.: 18/398,656

(22) Filed: Dec. 28, 2023

(65) Prior Publication Data
US 2024/0256010 A1 Aug. 1, 2024

(30) Foreign Application Priority Data
Jan. 31, 2023 (TW) ................................ 112103319

(51) Int. Cl.
*G06F 1/18* (2006.01)
(52) U.S. Cl.
CPC ................... *G06F 1/187* (2013.01)
(58) Field of Classification Search
CPC ........ G06F 1/181; G06F 1/187; G11B 33/128
See application file for complete search history.

(56) References Cited

U.S. PATENT DOCUMENTS

| 6,370,022 B1* | 4/2002 | Hooper | G06F 1/184 |
| | | | 361/679.33 |
| 6,377,447 B1* | 4/2002 | Boe | G06F 1/187 |
| | | | 361/829 |
| 6,464,085 B1* | 10/2002 | Chin | G11B 33/128 |
| 6,654,240 B1* | 11/2003 | Tseng | G06F 1/184 |
| | | | 361/679.33 |
| 7,102,885 B2* | 9/2006 | Chen | G11B 33/128 |
| 7,301,762 B2* | 11/2007 | Han | G11B 33/128 |
| 7,408,770 B2* | 8/2008 | Peng | G11B 33/124 |
| | | | 361/679.33 |
| 7,450,375 B2* | 11/2008 | Xu | G06F 1/184 |
| 7,523,901 B2* | 4/2009 | Wu | G11B 33/128 |
| | | | 248/27.3 |
| 7,611,100 B2* | 11/2009 | Peng | G11B 33/124 |
| | | | 361/679.02 |
| 7,733,640 B2* | 6/2010 | Huang | G11B 33/127 |
| | | | 361/679.33 |

(Continued)

*Primary Examiner* — Nidhi Thaker
(74) *Attorney, Agent, or Firm* — Michael Best & Friedrich LLP

(57) ABSTRACT

A fixing frame for a computer apparatus includes a frame body defining a plurality of receiving sub-spaces each configured for receiving a first or second electronic device. One side wall of the frame body is provided with protruding portions each defining a mounting groove and having an elongated sliding slot formed in a groove base wall of the mounting groove, and spaced-apart first and second positioning portions. A plurality of stop modules are respectively disposed in the protruding portions. Each stop module includes a slider having a stop plate portion, and an elastic positioning member having a movable portion. The stop plate portion is configured for stopping the first or second electronic device when the movable portion is engaged to the first or second positioning portion.

14 Claims, 8 Drawing Sheets

(56) References Cited

U.S. PATENT DOCUMENTS

| | | | | |
|---|---|---|---|---|
| 7,753,325 B2* | 7/2010 | Lin | ............ | G06F 1/187 |
| | | | | 248/225.11 |
| 8,061,535 B2* | 11/2011 | Cheng-Yuan | ........ | G11B 33/127 |
| | | | | 361/679.34 |
| 8,355,256 B2* | 1/2013 | Peng | .............. | G06F 1/187 |
| | | | | 235/441 |
| 8,432,680 B2* | 4/2013 | Peng | .............. | G11B 33/08 |
| | | | | 361/679.33 |
| 8,526,174 B2* | 9/2013 | Hsieh | ............ | G11B 33/128 |
| | | | | 248/27.3 |
| 9,412,418 B2* | 8/2016 | Hu | ............ | G06F 1/187 |
| 2003/0095377 A1* | 5/2003 | Goodman | ............ | G06F 1/187 |
| | | | | 361/725 |

* cited by examiner

FIXING FRAME FOR COMPUTER APPARATUS

CROSS-REFERENCE TO RELATED APPLICATION

This application claims priority to Taiwanese Invention Patent Application No. 112103319, filed on Jan. 31, 2023.

FIELD

The disclosure relates to a fixing frame for a computer apparatus, and more particularly to a fixing frame for receiving electronic devices having different lengths.

BACKGROUND

An existing computer apparatus usually reserves some expansion spaces for a user to install expansion devices according to his/her requirements, and sets some common specifications according to the types of the expansion devices to facilitate the user in choosing the required expansion device. Electronic devices, such as hard disk drives or optical disk drives, may all be applicable to use 5.25-inch expansion slots.

Currently, a fixing frame for a computer apparatus has a plurality of 5.25-inch expansion slots, and is suitable for fixing a plurality of 5.25-inch electronic devices in a stacked manner. The 5.25-inch electronic devices have different lengths, for example, a 5.25-inch optical disk drive (ODD) has a length shorter than that of a 5.25-inch linear tape-open (LTO) tape drive. More specifically, the fixing frame includes a frame body and a fixing rod. The frame body defines the expansion slots, and has a rear side that is open for extension of different lengths of the electronic devices therethrough. The frame body includes two side walls each of which has an inner side provided with a plurality of bumps respectively corresponding to the expansion slots and protruding toward the other side wall. Each 5.25-inch electronic device has two lateral sides respectively corresponding to the side walls of the frame body. Each lateral side of each 5.25-inch electronic device is provided with two fixing holes. When the user inserts an electronic device into one of the expansion slots, he/she can feel that the electronic device has reached the positioning position through the bumps of the side walls that enter the corresponding fixing holes. A bottom end of the fixing rod is pivoted to a bottom side of one of the side walls of the frame body, and a top end thereof is removably engaged to a top side of the one of the side walls. The fixing rod has a plurality of positioning studs inserted through the one of the side walls and respectively corresponding in position to the expansion slots. Each positioning stud is used for engaging the other fixing hole of the electronic device in the corresponding expansion slot. Before the electronic device is inserted into the corresponding expansion slot, it is necessary to disengage the fixing rod from the one of the side walls, and, after the electronic device has reached the positioning position, the fixing rod is engaged to the one of the side walls. The electronic device is fixed by inserting the positioning stud into the corresponding fixing hole thereof.

However, when the electronic device is inserted into the corresponding expansion slot, because the side walls of the frame body can expand and deform, the bumps cannot fit well with the corresponding fixing holes, so that the electronic device cannot be effectively stopped and positioned. Or, for example, the following reasons may influence the user's feeling of whether the bumps have been engaged with the corresponding fixing holes: Interference of screw bolts on the electronic device with the bumps; the fixing hole of the electronic device being embedded in the nut; and, interaction of the groove at the end of the electronic device and the bumps. Due to the aforesaid reasons, the stop and positioning function of the existing fixing frame through the cooperation of the bumps and the corresponding fixing holes is poor, so that the user cannot determine whether the electronic device is installed into place and must confirm it again and again. Furthermore, the fixing rod is likely to deform due to interference caused by improper assembly.

SUMMARY

Therefore, an object of the present disclosure is to provide a fixing frame for a computer apparatus that can alleviate at least one of the drawbacks of the prior art.

According to one aspect of this disclosure, the fixing frame for a computer apparatus is adapted for receiving a first electronic device and a second electronic device having a length greater than that of the first electronic device, and includes a frame body and a plurality of stop modules. The frame body includes opposite bottom and top walls, and two opposite side walls connected between the bottom and top walls. The bottom, top, and side walls cooperatively define a receiving space. Each side wall has a plurality of holding portions. The holding portions of the side walls cooperatively divide the receiving space into a plurality of receiving sub-spaces arranged in an up-down direction. Each receiving sub-space is configured for receiving a corresponding one of the first and second electronic devices in a front-rear direction.

One of the side walls is provided with a plurality of protruding portions that protrude outwardly therefrom in a left-right direction, that are spaced apart from each other in the up-down direction, and that respectively correspond to the receiving sub-spaces. Each protruding portion defines a mounting groove extending in the front-rear direction, and has an elongated sliding slot that is formed in a groove base wall of the mounting groove, that communicates with a respective receiving sub-space, and that extends in the front-rear direction, and a first positioning portion and a second positioning portion that are formed on the groove base wall of the mounting groove, that are spaced apart from each other in the front-rear direction, and that are adjacent to the elongated sliding slot.

The stop modules are respectively disposed in the protruding portions. Each stop module includes a slider and a first elastic positioning member. The slider has a main plate portion slidably disposed in the mounting groove, and a stop plate portion bent inwardly from one end of the main plate portion and located rearwardly of a corresponding one of the receiving sub-spaces. The first elastic positioning member is disposed on the main plate portion, is insertable into the elongated sliding slot, and is driven by the main plate portion to slide along the elongated sliding slot. The first elastic positioning member has a fixed portion fixed to the main plate portion, and a movable portion connected to the fixed portion and elastically displaceable away from the fixed portion in the left-right direction. The movable portion is normally located in a locking position, and is engageable with one of the first and second positioning portions.

When the movable portion is engaged to the first positioning portion, the stop plate portion is configured for stopping the first electronic device; and when the movable portion is engaged to the second positioning portion, the stop plate portion is configured for stopping the second electronic device. The movable portion is elastically moved to an unlocking position when the movable portion slides through the first or second positioning portion.

According to another aspect of this disclosure, the fixing frame for a computer apparatus is adapted for receiving a first electronic device and a second electronic device having a length greater than that of the first electronic device, and includes a frame body and a stop module. The frame body includes opposite bottom and top walls, and two opposite side walls connected between the bottom and top walls. The bottom, top and side walls cooperatively define a receiving space—for receiving the first or second electronic device in a front-rear direction. One of the side walls is provided with a protruding portion protruding outwardly therefrom in a left-right direction and corresponding to the receiving space. The protruding portion defines a mounting groove extending in the front-rear direction, and has an elongated sliding slot that is formed in a groove base wall of the mounting groove, that communicates with the receiving space and that extends in the front-rear direction, and a first positioning portion and a second positioning portion that are formed on the groove base wall of the mounting groove, that are spaced apart from each other along the front-rear direction, and that are adjacent to the elongated sliding slot.

The stop module is disposed in the protruding portion, and includes a slider and a first elastic positioning member. The slider has a main plate portion slidably disposed in the mounting groove, and a stop plate portion bent inwardly from one end of the main plate portion and located rearwardly of the receiving space. The first elastic positioning member is disposed on the main plate portion, is insertable into the elongated sliding slot, and is driven by the main plate portion to slide along the elongated sliding slot. The first elastic positioning member has a fixed portion fixed to the main plate portion, and a movable portion connected to the fixed portion and elastically displaceable away from the fixed portion in the left-right direction. The movable portion is normally located in a locking position and is engageable with one of the first and second positioning portions.

When the movable portion is engaged with the first positioning portion, the stop plate portion is configured for stopping the first electronic device; and when the movable portion is engaged with the second positioning portion, the stop plate portion is configured for stopping the second electronic device. The movable portion is elastically moved to an unlocking position when the movable portion slides through the first or second positioning portion.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
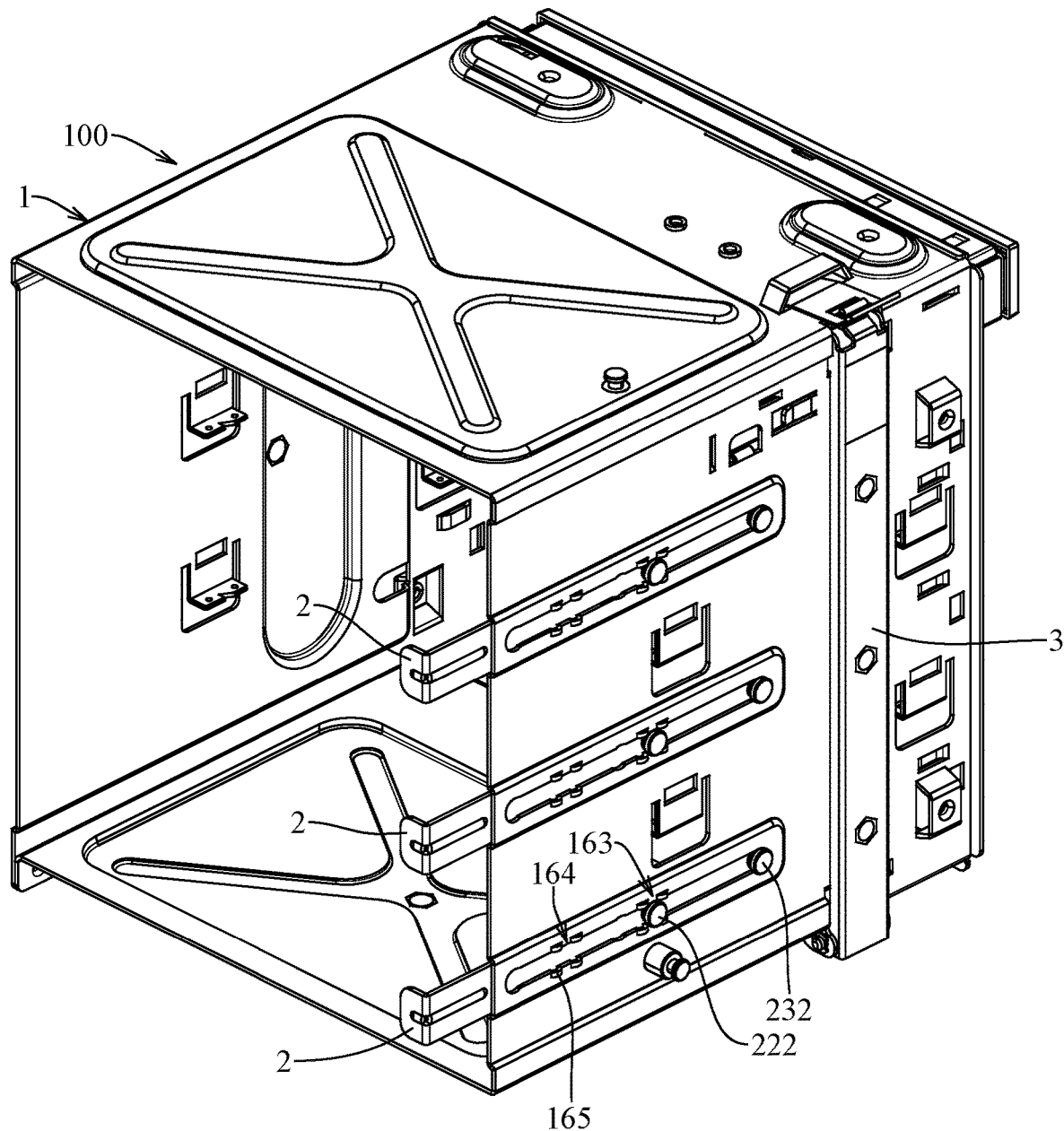
FIG. 1 is a perspective view of a fixing frame according to an embodiment of the present disclosure.

Referring to FIGS. 1 to 6, a fixing frame 100 for a computer apparatus according to an embodiment of the present disclosure is adapted for receiving a first electronic device (A1) and a second electronic device (A2) having a length greater than that of the first electronic device (A1). In this embodiment, the first electronic device (A1) is a 5.25-inch optical disk drive (ODD), and the second electronic device (A2) is a 5.25-inch linear tape-open (LTO) tape drive. Further, one first electronic device (A1) and two second electronic devices (A2) will be exemplified herein. The fixing frame 100 includes a frame body 1, a plurality of stop modules 2, and a fixing rod 3.

The frame body 1 includes a bottom wall 11, a top wall 12 opposite to the bottom wall 11, and two opposite side walls 13, 13' connected between the bottom wall 11 and the top wall 12. The bottom wall 11, the top wall 12, and the side walls 13, 13' cooperatively define a receiving space 14. Each side wall 13, 13' has a plurality of holding portions 15. The holding portions 15 of the side walls 13, 13' cooperatively divide the receiving space 14 into a plurality of receiving sub-spaces 141 arranged in an up-down direction (D1). Each receiving sub-space 141 is adapted for receiving a corresponding one of the first and second electronic devices (A1, A2) in a front-rear direction (D2). The side wall 13 is formed with a plurality of protruding portions 131 that protrude outwardly therefrom in a left-right direction (D3), that are spaced apart from each other in the up-down direction (D1), and that respectively correspond to the receiving sub-spaces 141.

Each protruding portion 131 defines a mounting groove 161 extending in the front-rear direction (D2), and has an elongated sliding slot 162 that is formed in a groove base wall of the mounting groove 161, that communicates with a respective one of the receiving sub-spaces 141, and that extends in the front-rear direction (D2), and a first positioning portion 163 and a second positioning portion 164 that are formed on the groove base wall of the mounting groove 161, that are spaced apart from each other in the front-rear direction (D2), and that are adjacent to the sliding slot 162. The mounting groove 161 has a closed end (161*a*) proximate to a front side of the side wall 13, and an open end (161*b*) proximate to a rear end of the side wall 13. The open end (161*b*) is configured to allow the slider 21 to extend out of the mounting groove 161. The sliding slot 162 has a main portion (162*a*), a front end portion (162*b*) proximate to the closed end (161*a*), a rear end portion (162*c*) proximate to the open end (161*b*), and two enlarged portions (162*d*, 162*d'*) spaced apart from each other in the front-rear direction (D2). The enlarged portion (162*d*) is overlapped with the rear end portion (162*c*), while the enlarged portion (162*d'*) is located between the first and second positioning portions 163, 164. The first positioning portion 163 is located between the front end portion (162*b*) and the enlarged portion (162*d'*), while the second positioning portion 164 is located between the enlarged portion (162*d*) and the rear end portion (162*c*). In this embodiment, each of the first and second positioning portions 163, 164 has four protrusions 165 equally provided on upper and lower sides of the sliding slot 162. Each protrusion 165 has a curved surface (165*a*) protruding outwardly in the left-right direction (D3).

Figure 4:
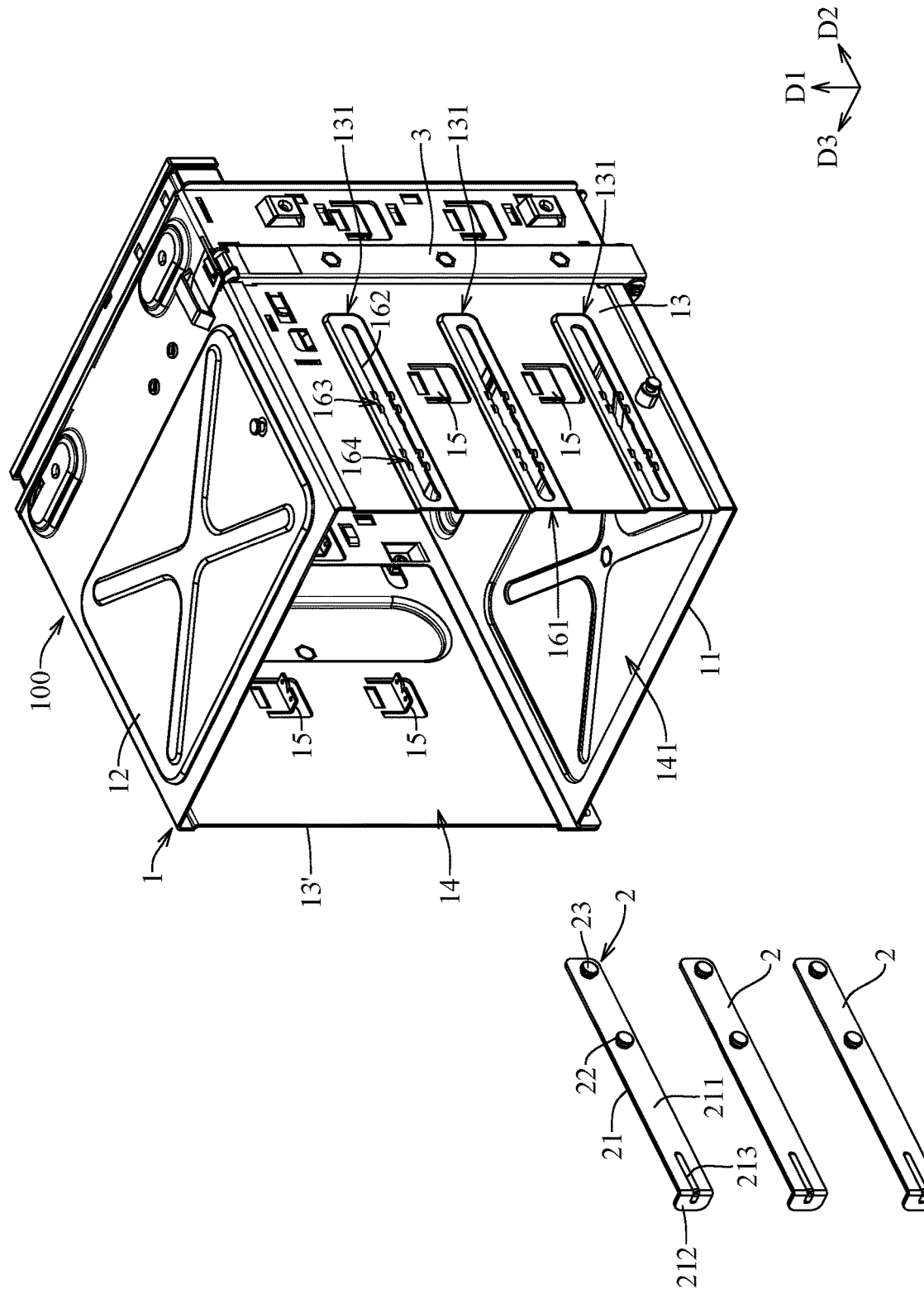
FIG. 4 is a view similar to FIG. 1, but with stop modules of the embodiment being removed for the sake of clarity.
Figure 5:
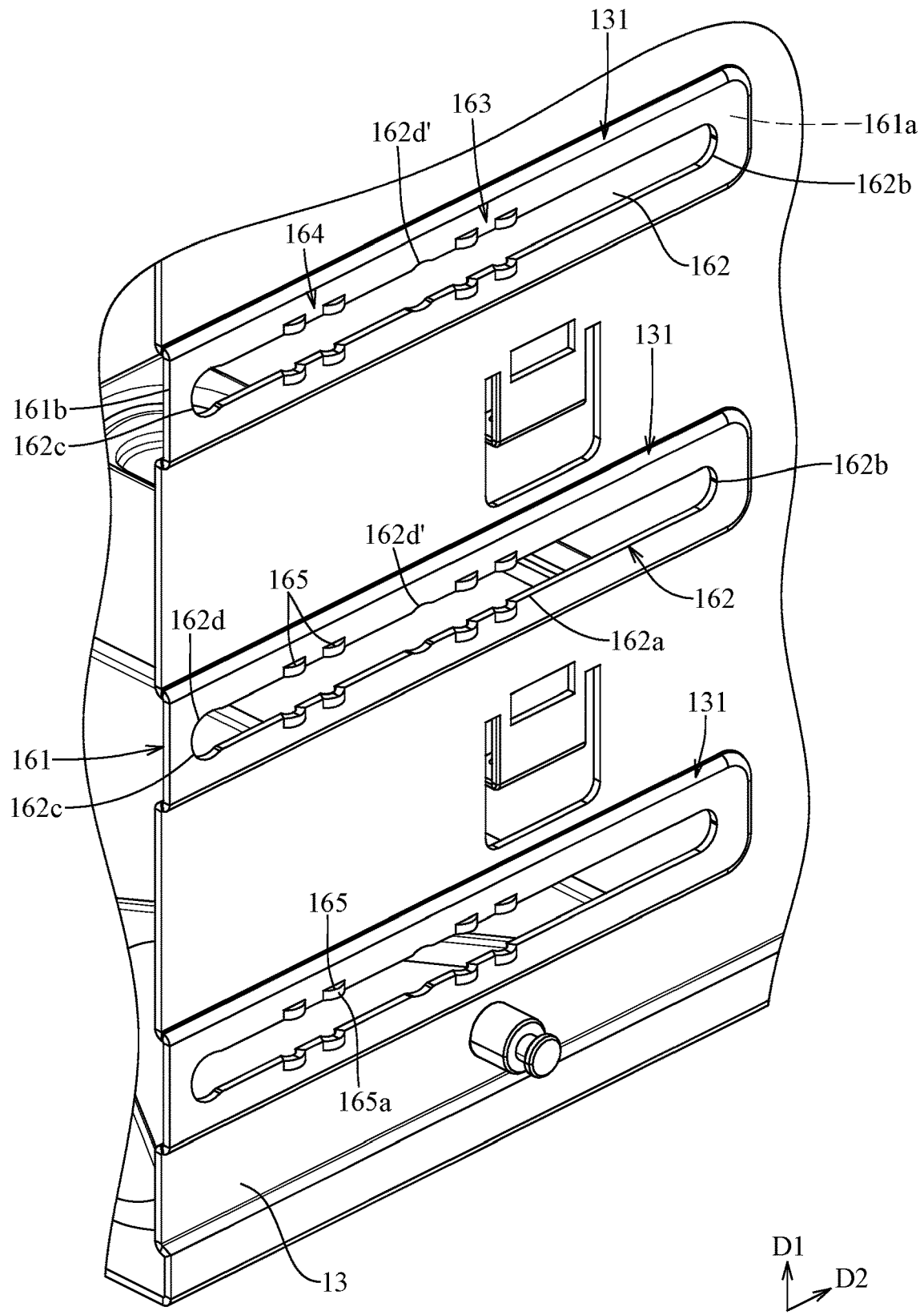
FIG. 5 is a fragmentary enlarged perspective view of a portion of FIG. 4.
Figure 6:
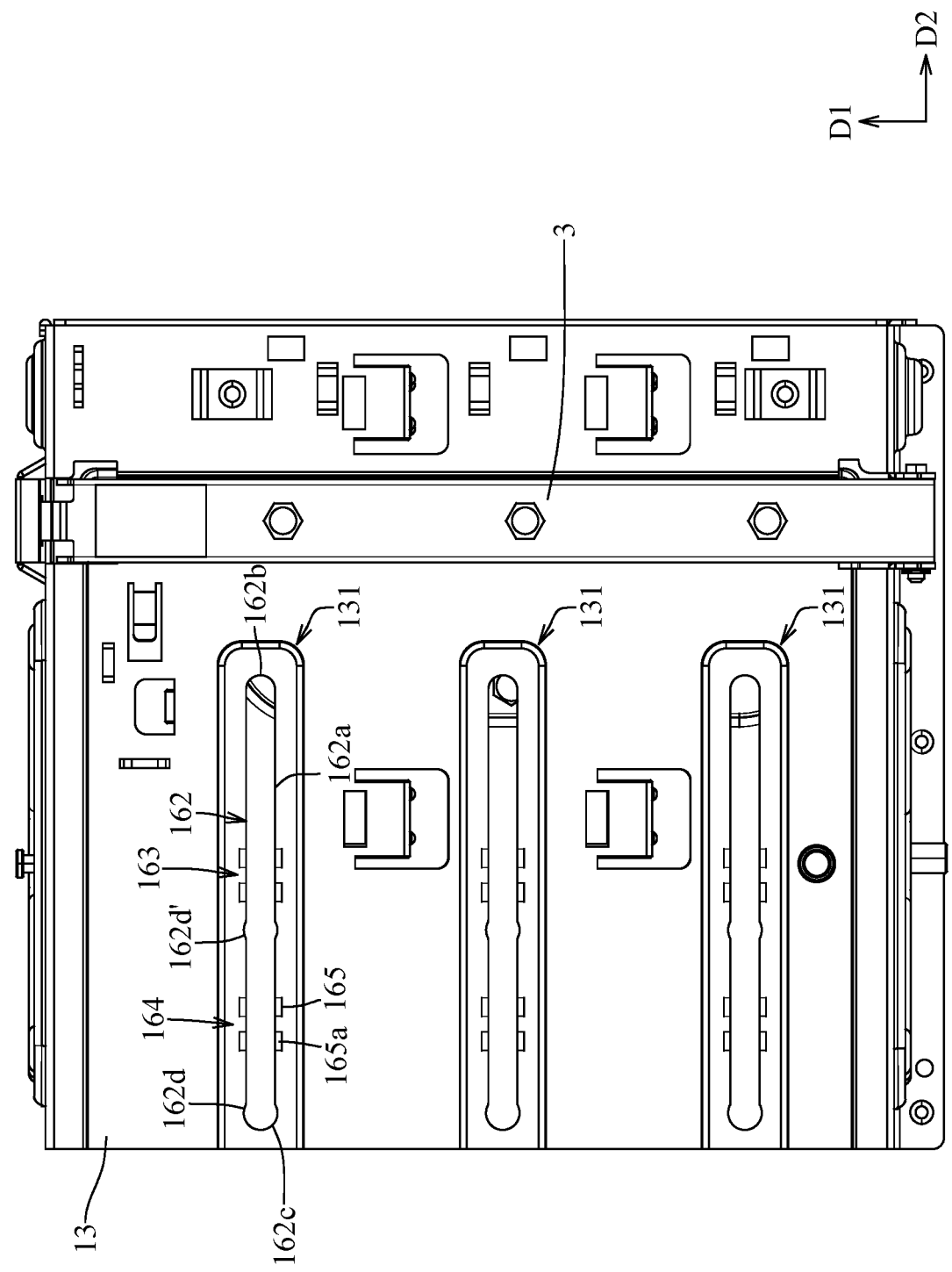
FIG. 6 is a side view of the frame body of the embodiment.
Figure 7:
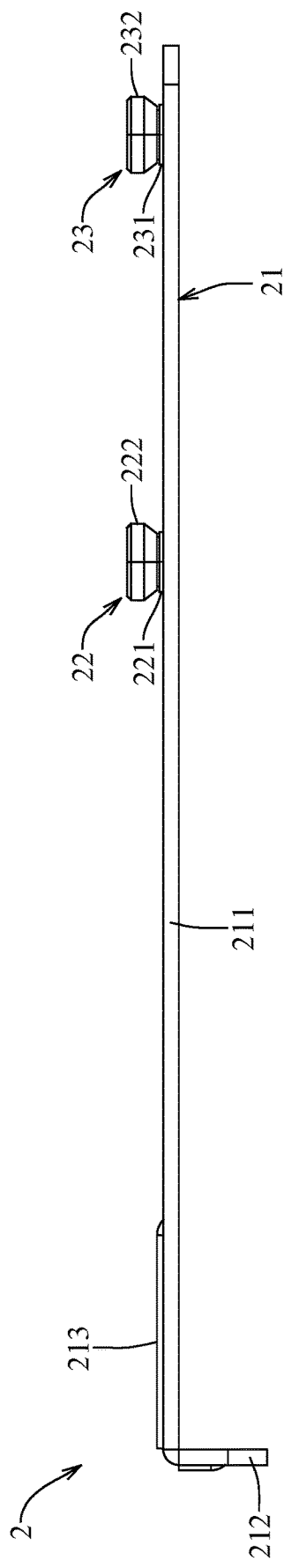
FIG. 7 is a side view of the stop module of the embodiment with first and second elastic positioning members thereof in a locking position.

Referring to FIG. 7, in combination with FIGS. 1, 4 and 5, the stop modules 2 are respectively disposed in the protruding portions 131. Each stop module 2 includes a slider 21, a first elastic positioning member 22 and a second elastic positioning member 23. The slider 21 of each stop module 2 has a main plate portion 211 slidably disposed in the mounting groove 161 of the respective protruding portion 131, a stop plate portion 212 bent inwardly from one end of the main plate portion 211 and located rearwardly of a corresponding one of the receiving sub-spaces 141, and a reinforcing rib 213 for reinforcing a junction between the stop plate portion 212 and the main plate portion 211. In this embodiment, the main plate portion 211 is elongated, and the stop plate portion 212 is bent perpendicularly from a rear end of the main plate portion 211.

Figure 8:
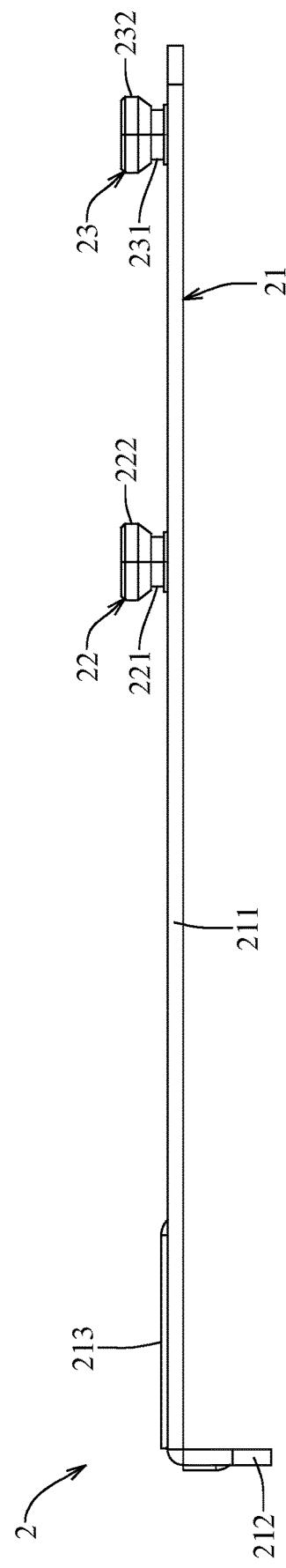
FIG. 8 is a view similar to FIG. 7, but with the first and second elastic positioning members of the stop module in an unlocking position.
Figure 9:
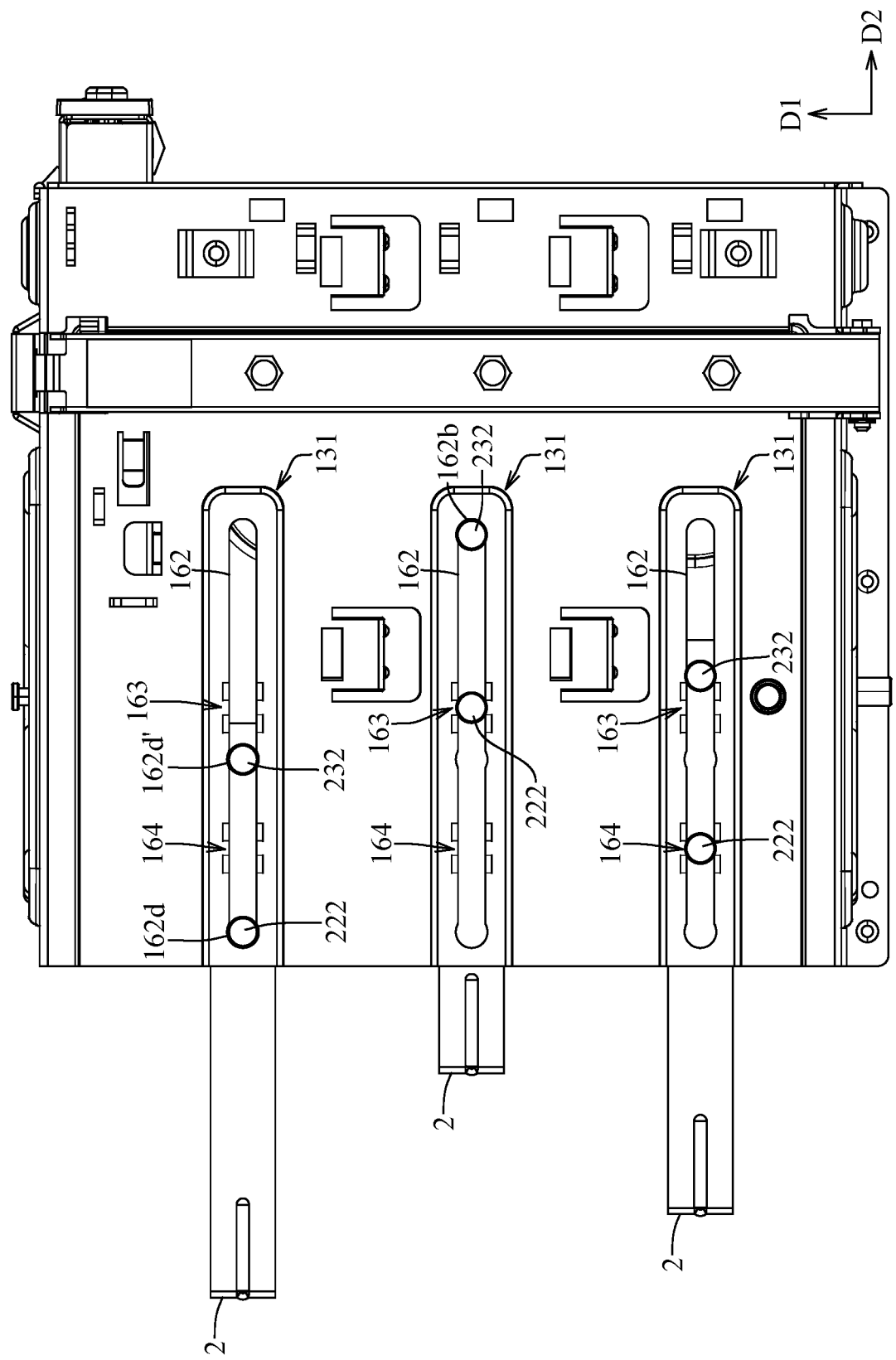
FIG. 9 is a side view of the embodiment, illustrating the stop modules at different positions.

Referring to FIGS. 8 and 9, in combination with FIGS. 5 and 7, the first and second elastic positioning members 22, 23 of each stop module 2 are disposed on the main plate portion 211, are insertable into the sliding slot 162 of the respective protruding portion 131 through the enlarged portions (162*d*, 162*d'*), and are driven by the main plate portion 211 to slide along the sliding slot 162. The first elastic positioning member 22 has a fixed portion 221 fixed to the main plate portion 211, and a movable portion 222 connected to the fixed portion 221 and elastically displaceable away from the fixed portion 221 in the left-right direction (D3). The movable portion 222 is normally located in a locking position (see FIG. 7), and is engageable with one of the first and second positioning portions 163, 164. When the movable portion 222 slides through the first positioning portion 163 or the second positioning portion 164, it is elastically moved to an unlocking position (see FIG. 8) by the curved surfaces (165*a*) (see FIG. 5) of the first or second positioning portion 163, 164. That is, when the movable portion 222 moves along with the slider 21, it can slide along the curved surfaces (165*a*) of the protrusions 165 and can be pushed by the same to elastically move to the unlocking position by passing through the protrusions 165. After passing through the protrusions 165, the movable portion 222 is restored to its normally locking position by an internal spring (not shown) thereof. When the movable portion 222 is located between the four protrusions 165 of the first or second positioning portion 163, 164, it is restored to the locking position. Further, when no external force is applied to slide the slider 21 in the front-rear direction (D2), the movable portion 222 is cooperatively limited by the protrusions 165 from moving along the sliding slot 162.

The second elastic positioning member 23 has the same structure as the first elastic positioning member 22, and similarly has a fixed portion 231 fixed to the main plate portion 211, and a movable portion 232 connected to the fixed portion 231 and elastically displaceable away from the fixed portion 231. The second elastic positioning member 23 is located adjacent to an end of the main plate portion 211 that is opposite to the stop plate portion 212, and is spaced apart from the first elastic positioning member 22 in the front-rear direction (D2). In this embodiment, each of the first and second elastic positioning members 22, 23 is a commercially available spring lock.

The movable portion 222, 232 of each of the first and second elastic positioning members 22, 23 of each stop module 2 has an outer diameter greater than a width of the main portion (162*a*) of the sliding slot 162 of the respective protruding portion 131 measured in the up-down direction (D1), so that each protruding portion 131 can be clamped between the main plate portion 211 and the movable portions 222, 232 of the first and second elastic positioning members 22, 23 of the respective stop module 2. The enlarged portions (162*d*, 162*d'*) of the sliding slot 162 of each protruding portion 131 are configured to allow the movable portions 222, 232 of the first and second elastic positioning members 22, 23 of the respective stop module 2 to pass therethrough for mounting and removal of each stop module 2 to and from the respective protruding portion 131. Through this configuration, use of tools is not required during assembly of each stop module 2 onto the frame body 1. After the assembly of each stop module 2 onto the frame body 1, since the enlarged portions (162*d*, 162*d'*) of the sliding slot 162 of each protruding portion 131 are spaced apart from the first and second positioning portions 163, 164, when the slider 21 of each stop module 2 is moved along the sliding slot 162 of the respective protruding portion 131 until the movable portion 222 of the first elastic positioning member 22 is engaged with the first or second positioning portion 163, 164 or the movable portion 232 of the second elastic positioning member 22, 23 is engaged with the first positioning portion 163, the movable portions 222, 232 of the first and second elastic positioning members 22, 23 are prevented from moving back to the corresponding enlarged portions (162*d*, 162'), thereby preventing the slider 21 of each stop module 2 from separating from the respective protruding portion 131.

When it is desired to mount each stop module 2 to the respective protruding portion 131, with reference to the uppermost stop module 2 and the uppermost protruding portion 131 shown in FIG. 9, the movable portions 222, 232 of the first and second elastic positioning members 22, 23 are respectively aligned with the enlarged portions (162*d*, 162*d'*) of the sliding slot 162 firstly, after which the movable portions 222, 232 are inserted through the respective enlarged portions (162*d*, 162*d'*) so that the main plate portion 211 abuts against the protruding portion 131 at the groove base wall of the mounting groove 161. Thereafter, with reference to the middle stop module 2 and the middle protruding portion 131 shown in FIG. 9, the slider 21 is pushed forwardly until the second elastic positioning member 23 is located at the front end portion (162*b*) of the sliding slot 162, and the movable portion 222 of the first elastic positioning member 22 is engaged with the first positioning portion 163, thereby positioning the stop module 2 onto the protruding portion 131. When the movable portion 222 is engaged to the first positioning portion 163, the stop plate portion 212 is used for stopping the first electronic device (A1) (see FIG. 3). With reference to the lowermost stop module 2 and the lowermost protruding portion 131 shown in FIG. 9, when the movable portion 222 of the first elastic positioning member 22 is engaged to the second positioning portion 164, the movable portion 232 of the second elastic positioning member 23 abuts against a front side of the first positioning portion 163. At this time, the stop plate portion 212 is used for stopping the second electronic device (A2) (see FIG. 3).

With reference to FIGS. 1 to 4, in this embodiment, the side wall 13 is further provided with three positioning through holes 132 spaced apart in the up-down direction (D1). The fixing rod 3 has a bottom end pivoted to the bottom wall 11 of the frame body 1, a top end removably engaged with the top wall 12 of the frame body 1, and three positioning studs 31 respectively corresponding to the positioning through holes 132. If a user desires to insert the first electronic device (A1) and the two second electronic devices (A2) into the respective receiving sub-spaces 141, the top end of the fixing rod 3 is first disengaged and moved away from the top wall 12 of the frame body 1. After the first and second electronic devices (A1, A2) are positioned in place, the top end of the fixing rod 3 is then engaged to the top wall 12 of the frame body 1. By inserting the positioning studs 31 through the respective positioning through holes 132 into corresponding fixing holes (not shown) in the first and second electronic devices (A1, A2), the first and second electronic devices (A1, A2) can be fixed to the frame body 1.

As shown in FIG. 1, before each electronic device (A1, A2) is mounted to the frame body 1, the movable portion 222 of the first elastic positioning member 22 of each stop module 2 is first engaged to the first positioning portion 163 of the respective protruding portion 131 to facilitate subsequent use of each stop module 2.

Figure 2:
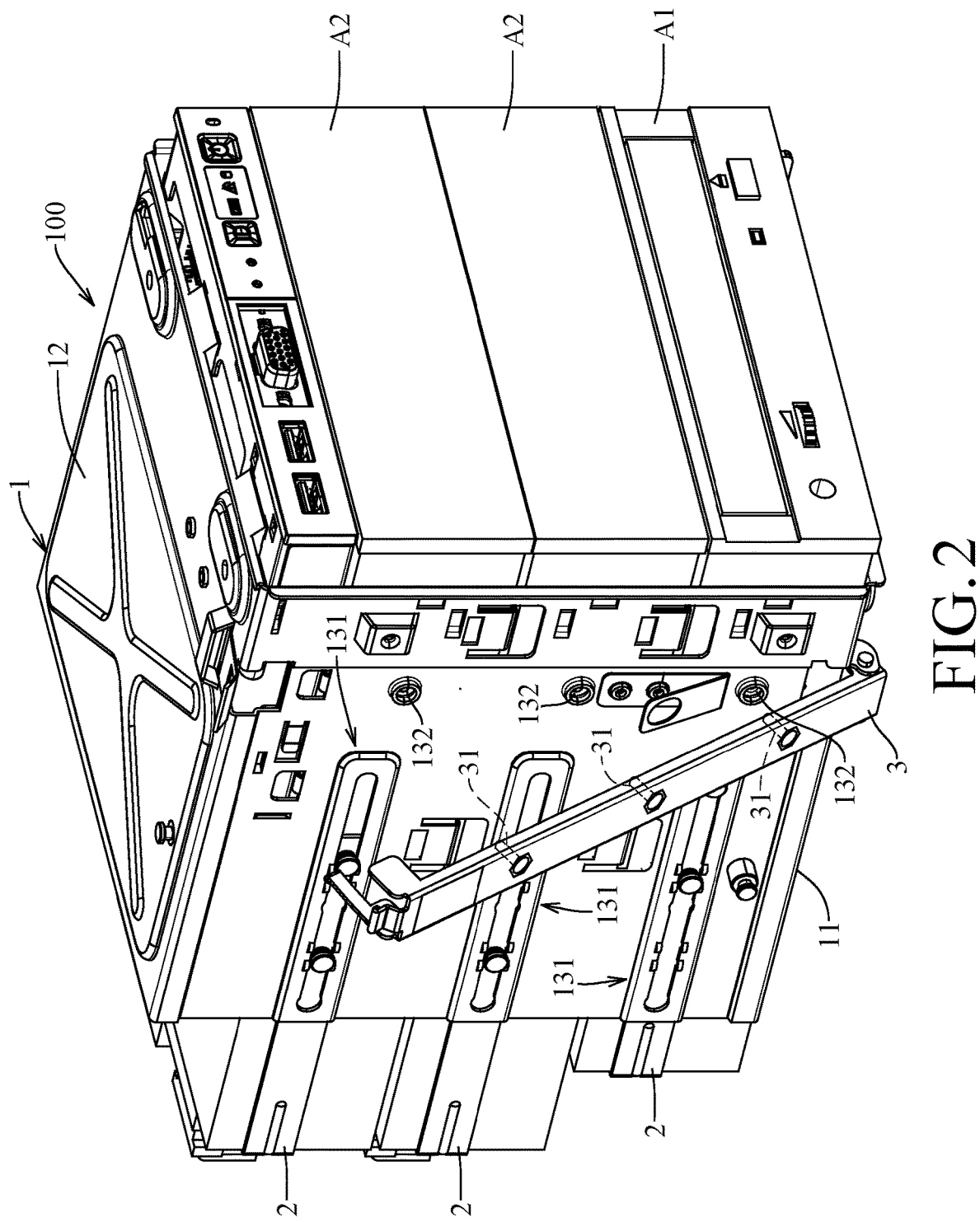
FIG. 2 is another perspective view of the embodiment in a state of use.
Figure 3:
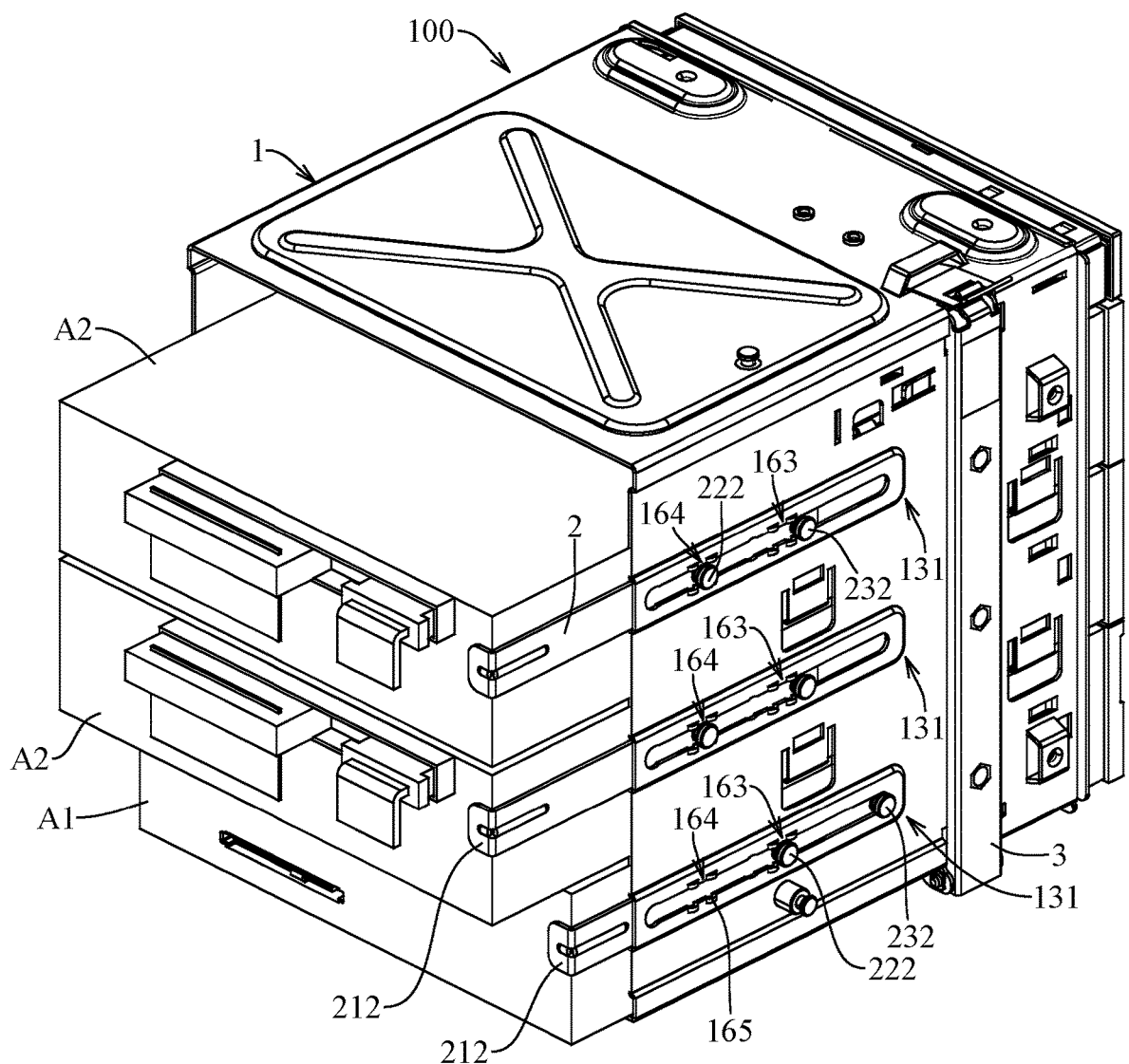
FIG. 3 is a view similar to FIG. 2, but taken from another angle and with a fixing rod engaged to a side wall of a frame body of the embodiment.

With reference to FIGS. 2 and 3, if the user desires to mount the first electronic device (A1) to the frame body 1, the first electronic device (A1) is simply inserted into one of the receiving sub-spaces 141 until the rear end thereof abuts against the stop plate portion 212 of the slider 21 of the corresponding stop module 2. Through this, it can be known that the positioning of the first electronic device (A1) has been achieved. If the user desires to mount the second electronic device (A2) to the frame body 1, the second electronic device (A2) is inserted into another one of the receiving sub-spaces 141, and, when the rear end thereof abuts against the stop plate portion 212 of the slider 21 of the corresponding stop module 2, the user continuously pushes the second electronic device (A2) to move rearwardly. During the rearward pushing of the second electronic device (A2), the user can feel that the movable portion 222 of the first elastic positioning member 22 has first passed over the protrusions 165 at the rear side of the first positioning portion 163 and then passed over the protrusions 165 at the front side of the second positioning portion 164, and is blocked by the protrusions 165 at the rear side of the second positioning portion 164. Through this, it can then be known that the positioning of the second electronic device (A2) has been achieved. With the slider 21 slidable in the front-rear direction (D2) and with the movable portion 222 of the first elastic positioning member 22 interacting with the first and second positioning portions 163, 164 to produce a positioning feel, not only the expansion and deformation of the side walls 13, 13' can be prevented, but also the positioning of the electronic devices (A1, A2) of different lengths is easy. Furthermore, because the stop plate portion 212 of the slider 21 of each stop module 2 can abut against the rear side of the corresponding electronic device, the structural features of the different electronic devices can be prevented from affecting the positioning feel of the user during mounting thereof.

It can be understood that, in other variations of this embodiment, the frame body 1 may have the receiving space 14 that is not divided into the receiving sub-spaces 141, the side wall 13' may be provided with only one protruding portion 131, and the fixing frame 100 may only include one stop module 2.

In summary, through the cooperation of the protruding portions 131 and the stop modules 2, a clear positioning feel can be produced when the user mounts each electronic device to the frame body 1. Further, the electronic devices with different lengths are easy to be positioned to the frame body 1, and the structural features of the different electronic devices can be prevented from affecting the positioning feel of the user during mounting thereof. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fixing frame for a computer apparatus and adapted for receiving a first electronic device and a second electronic device having a length greater than that of the first electronic device, said fixing frame comprising:
    a frame body including a bottom wall, a top wall opposite to said bottom wall, and two opposite side walls connected between said bottom wall and said top wall, wherein said bottom wall, said top wall, and said side walls cooperatively define a receiving space, each of said side walls having a plurality of holding portions, said holding portions of said side walls cooperatively dividing said receiving space into a plurality of receiving sub-spaces arranged in an up-down direction, each of said receiving sub-spaces being configured for receiving a corresponding one of the first electronic device and the second electronic device in a front-rear direction, one of said side walls being provided with a plurality of protruding portions that protrude outwardly therefrom in a left-right direction, that are spaced apart from each other in the up-down direction, and that respectively correspond to said receiving sub-spaces, each of said protruding portions defining a mounting groove extending in the front-rear direction, and having an elongated sliding slot that is formed in a groove base wall of said mounting groove, that communicates with a respective one of said receiving sub-spaces, and that extends in the front-rear direction, and a first positioning portion and a second positioning portion that are formed on said groove base wall of said mounting groove, that are spaced apart from each other in the front-rear direction and that are adjacent to said elongated sliding slot; and
    a plurality of stop modules respectively disposed in said protruding portions, each of said stop modules including a slider and a first elastic positioning member, said slider having a main plate portion slidably disposed in said mounting groove, and a stop plate portion bent inwardly from one end of said main plate portion and located rearwardly of a corresponding one of said receiving sub-spaces, said first elastic positioning member being disposed on said main plate portion, being insertable into said elongated sliding slot, and being driven by said main plate portion to slide along said elongated sliding slot, said first elastic positioning member having a fixed portion fixed to said main plate portion, and a movable portion connected to said fixed portion and elastically displaceable away from said fixed portion in the left-right direction, said movable portion being normally located in a locking position, and being engageable with one of said first positioning portion and said second positioning portion;
    wherein, when said movable portion is engaged to said first positioning portion, said stop plate portion is configured for stopping the first electronic device; and, when said movable portion is engaged to said second positioning portion, said stop plate portion is configured for stopping said second electronic device; and wherein said movable portion is elastically moved to an unlocking position when said movable portion slides through said first positioning portion or said second positioning portion.

2. The fixing frame as claimed in claim 1, wherein each of said first positioning portion and said second positioning portion has four protrusions provided on upper and lower sides of said elongated sliding slot and cooperatively limiting movement of said movable portion along said elongated sliding slot, each of said protrusions having a curved surface protruding outwardly in the left-right direction, said movable portion being slidable along said curved surfaces of said protrusions.

3. The fixing frame as claimed in claim 1, wherein said mounting groove has a closed end proximate to a front side of said one of said side walls, and an open end proximate to a rear side of said one of said side walls, said open end being configured to allow said slider to extend out of said mounting groove, said elongated sliding slot having a front end portion proximate to said closed end, and a rear end portion proximate to said open end, said first positioning portion being located between said front end portion and said second positioning portion, said second positioning portion being located between said first positioning portion and said rear end portion.

4. The fixing frame as claimed in claim 3, wherein each of said stop modules further includes a second elastic positioning member located adjacent to an end of said main plate portion that is opposite to said stop plate portion and spaced apart from said first elastic positioning member, said second elastic positioning member having a fixed portion fixed to said main plate portion, and a movable portion connected to said fixed portion of said second elastic positioning member and elastically displaceable from said fixed portion of said second elastic positioning member in the left-right direction.

5. The fixing frame as claimed in claim 4, wherein, when said movable portion of said first elastic positioning member is engaged to said first positioning portion, said second elastic positioning member is located at said front end portion of said elongated sliding slot; and, when said movable portion of said first elastic positioning member is engaged to said second positioning portion, said movable portion of said second elastic positioning member abuts against a front side of said first positioning portion.

6. The fixing frame as claimed in claim 4, wherein said elongated sliding slot further has a main portion and two enlarged portions spaced apart from each other in the front-rear direction and configured to allow said movable portion of said first elastic positioning member and said movable portion of said second elastic positioning member to pass respectively therethrough, one of said enlarged portions being overlapped with said rear end portion, the other one of said enlarged portions being located between said first positioning portion and said second positioning portion, said movable portion of each of said first elastic positioning member and said second elastic positioning member having an outer diameter greater than a width of said main portion.

7. The fixing frame as claimed in claim 1, wherein said slider further has a reinforcing rib for reinforcing a junction between said stop plate portion and said main plate portion.

8. The fixing frame as claimed in claim 1, wherein said one of said side walls is further provided with a plurality of positioning through holes spaced apart in the up-down direction, said fixing frame further comprising a fixing rod which has a bottom end pivoted to said bottom wall of said frame body, a top end removably engaged with said top wall of said frame body, and a plurality of positioning studs respectively corresponding to said positioning through holes, each of said positioning studs being configured to extend through a respective one of said positioning through holes into a fixing hole of the first electronic device or the second electronic device for fixing the first electronic device or the second electronic device to said frame body.

9. A fixing frame for a computer apparatus and adapted for receiving a first electronic device and a second electronic device having a length greater than that of the first electronic device, said fixing frame comprising:

a frame body including a bottom wall, a top wall opposite to said bottom wall, and two opposite side walls connected between said bottom wall and said top wall, wherein said bottom wall, said top wall and said side walls cooperatively define a receiving space for receiving the first electronic device or the second electronic device in a front-rear direction, one of said side walls being provided with a protruding portion protruding outwardly therefrom in a left-right direction, said protruding portion defining a mounting groove that extends in the front-rear direction, and having an elongated sliding slot that is formed in a groove base wall of said mounting groove, that communicates with said receiving space and that extends in the front-rear direction, and a first positioning portion and a second positioning portion that are formed on said groove base wall of said mounting groove, that are spaced apart from each other along the front-rear direction and that are adjacent to said elongated sliding slot; and a stop module disposed in said protruding portion and including a slider and a first elastic positioning member, said slider having a main plate portion slidably disposed in said mounting groove, and a stop plate portion bent inwardly from one end of said main plate portion and located rearwardly of said receiving space, said first elastic positioning member being disposed on said main plate portion, being insertable into said elongated sliding slot, and being driven by said main plate portion to slide along said elongated sliding slot, said first elastic positioning member having a fixed portion fixed to said main plate portion, and a movable portion connected to said fixed portion and elastically displaceable away from said fixed portion in the left-right direction, said movable portion being normally located in a locking position and being engageable with one of said first positioning portion and said second positioning portion;

wherein, when said movable portion is engaged with said first positioning portion, said stop plate portion is configured for stopping the first electronic device; and, when said movable portion is engaged with said second positioning portion, said stop plate portion is configured for stopping the second electronic device;

wherein said movable portion is elastically moved to an unlocking position when said movable portion slides through said first positioning portion or said second positioning portion.

10. The fixing frame as claimed in claim 9, wherein each of said first positioning portion and said second positioning portion has four protrusions provided on upper and lower sides of said elongated sliding slot and cooperatively limiting movement of said movable portion along said elongated sliding slot, each of said protrusions having a curved surface protruding outwardly in the left-right direction, said movable portion being slidable along said curved surfaces of said protrusions.

11. The fixing frame as claimed in claim 9, wherein said mounting groove has a closed end proximate to a front side of said one of said side walls, and an open end proximate to a rear side of said one of said side walls, said open end being configured to allow said slider to extend out of said mounting groove, said elongated sliding slot having a front end portion proximate to said closed end, and a rear end portion proximate to said open end, said first positioning portion being located between said front end portion and said second positioning portion, said second positioning portion being located between said first positioning portion and said rear end portion.

12. The fixing frame as claimed in claim 11, wherein said stop module further includes a second elastic positioning member located adjacent to an end of said main plate portion that is opposite to said stop plate portion and spaced apart from said first elastic positioning member, said second elastic positioning member having a fixed portion fixed to said main plate portion, and a movable portion connected to said fixed portion of said second elastic positioning member and elastically displaceable from said fixed portion of said second elastic positioning member in the left-right direction, and wherein, when said movable portion of said first elastic positioning member is engaged to said first positioning portion, said second elastic positioning member is located at said front end portion of said elongated sliding slot; and, when said movable portion of said first elastic positioning member is engaged to said second positioning portion, said movable portion of said second elastic positioning member abuts against a front side of said first positioning portion.

13. The fixing frame as claimed in claim 12, wherein said elongated sliding slot further has a main portion and two enlarged portions spaced apart from each other in the front-rear direction and configured to allow said movable portion of said first elastic positioning member and said movable portion of said second elastic positioning member to pass respectively therethrough, one of said enlarged portions being overlapped with said rear end portion, the other one of said enlarged portions being located between said first positioning portion and said second positioning portion, said movable portion of each of said first elastic positioning member and said second elastic positioning member having an outer diameter greater than a width of said main portion.

14. The fixing frame as claimed in claim 9, wherein said slider further has a reinforcing rib for reinforcing a junction between said stop plate portion and said main plate portion.

\* \* \* \* \*